(12) United States Patent
Brown (10) Patent No.: US 6,754,211 B1
(45) Date of Patent: Jun. 22, 2004

(54) METHOD AND APPARATUS FOR WIRE SPEED IP MULTICAST FORWARDING

(75) Inventor: David A. Brown, Ontario (CA)

(73) Assignee: Mosaid Technologies, Inc., Kanata (CA)

( * ) Notice: Subject to any disclaimer, the term of this patent is extended or adjusted under 35 U.S.C. 154(b) by 0 days.

(21) Appl. No.: 09/453,344

(22) Filed: Dec. 1, 1999

(51) Int. Cl.[7] .............................................. H04L 12/28
(52) U.S. Cl. ....................... 370/389; 370/390; 709/219; 709/249
(58) Field of Search ................................ 370/389, 390, 370/392, 397, 399, 401, 402, 432, 395, 395.1, 395.52, 395.53, 395.54; 709/219, 249

(56) References Cited

U.S. PATENT DOCUMENTS

| | | | |
|---|---|---|---|
| 5,898,687 A | 4/1999 | Harriman et al. | ........... 370/390 |
| 5,963,552 A | 10/1999 | Joo et al. | ..................... 370/390 |
| 6,128,654 A | * 10/2000 | Runaldue et al. | ........... 709/219 |

OTHER PUBLICATIONS

Xiong, Y., et al., "Analysis of multicast ATM switching networks using CRWR scheme", Computer Networks and ISDN Systems, 30(8) : 835–854 NL, North Holland Publishing, Amsterdam (May, 1998).

"Multicast/Broadcast Mechanism for a Shared Buffer Packet Switch", IBM Technical Disclosure Bulletin, 34(10A) : 464–465 U.S. IBM Corp. New York, vol., (Mar., 1992).

* cited by examiner

*Primary Examiner*—Douglas Olms
*Assistant Examiner*—Robert W. Wilson
(74) *Attorney, Agent, or Firm*—Hamilton, Brook, Smith & Reynolds P.C.

(57) ABSTRACT

In a switch including a plurality of ports, an IP Multicast packet arriving on an ingress port a copy of the receiver packet is forwarded to each member of the IP Multicast group at wire-speed. The packet is bridged once to a given egress port and may be routed multiple times out of the egress port. If multiple subnets exist on an egress port, each subnet that requires a copy of the packet will receive the packet with its VLAN ID included in the packet. The received IP Multicast packet for an IP Multicast group is stored in memory, a pointer to the location of the packet in memory is stored for each port to which a copy of the packet is to be forwarded. An IP Multicast forwarding entry is provided for the IP Multicast group. The forwarding entry includes a modification entry for each packet to be forwarded to the IP Multicast group. A copy of the stored packet is modified dependent on the modification entry and forwarded in the next available port cycle for the port.

21 Claims, 9 Drawing Sheets

Packet 300:

| PHYSICAL LAYER (L1) HEADER 302 | DATA LINK LAYER (L2) HEADER 304 | NETWORK LAYER (L3) HEADER 306 | TRANSPORT LAYER (L4) HEADER 308 | DATA 310 | CHECKSUM 312 |

FIG. 3B
PRIOR ART

Data Link Layer Header 304:

| DESTINATION ADDRESS (DA) (6 BYTES) 314 | SOURCE ADDRESS (SA) (6 BYTES) 316 | VLAN ID (OPTIONAL) | | LENGTH/TYPE (2 BYTES) 320 |
|---|---|---|---|---|
| | | TAG PROTOCOL IDENTIFIER (TPID) (2 BYTES) 318a | TAG CONTROL INFORMATION (TCI) (2 BYTES) 318b | |

METHOD AND APPARATUS FOR WIRE SPEED IP MULTICAST FORWARDING

BACKGROUND OF THE INVENTION

In a computer network, a networking switch receives a data packet at an ingress port connected to the switch and forwards the data packet to an egress port connected to the switch. The switch determines the egress port to which the data packet is forwarded dependent on a destination address included in the data packet received at the ingress port.

A destination node connected to an egress port may be a member of an IP Multicast group. A destination node joins an IP Multicast group in order to receive IP Multicast data such as a real-time video. A switch receiving an IP Multicast data packet at an ingress port must forward a copy of the received IP Multicast data packet to all members of the IP Multicast Group connected to the switch.

By transmitting one IP Multicast data packet to the ingress port instead of multiple unicast data packets, one for each member of the IP Multicast group, the number of data packets transmitted to the switch is reduced. However, the time to process the IP Multicast data packet in the switch is increased because the switch must determine to which egress ports the IP Multicast data packet is to be forwarded, and the number of copies to forward to each egress port.

The switch must forward a copy of the IP Multicast data packet to each member of the IP Multicast group. Thus, multiple copies of the IP Multicast data packet are forwarded to an egress port if multiple members of the IP Multicast group are connected to the egress port. A copy of the IP Multicast data packet is modified by the networking switch before being forwarded to a member of the IP Multicast group.

Typically, the forwarding of an IP Multicast data packet through a switch to an egress port, is performed by a host processor in the networking switch. Host processor based forwarding is slow.

SUMMARY OF THE INVENTION

A copy of an IP Multicast data packet received at an ingress port of a networking switch is forwarded at wire speed to an egress port. The IP Multicast data packet received at the ingress port is stored in memory. A copy of the stored IP Multicast data packet is forwarded to egress port forwarding logic. The egress port forwarding logic includes a modification entry for each member of the IP Multicast group associated with the IP Multicast data packet. Upon receiving a copy of an IP Multicast data packet from memory, the egress port forwarding logic modifies the copy of the IP Multicast data packet dependent on a modification entry associated with the egress port to which the IP Multicast data packet is to be forwarded.

Ingress port forwarding logic in the switch generates a multicast forward vector for the IP Multicast data packet. The Multicast forward vector indicates to which port the stored IP Multicast data packet is to be forwarded.

Port queue logic in the switch stores a pointer to the location of the IP Multicast data packet in memory on a port queue dependent on the multicast forward vector. The port queue logic removes the pointer after the IP Multicast data packet has been forwarded to all members of the IP Multicast group connected to the egress port associated with the port queue.

The modification entry may include an identification for a Virtual LAN, a pointer to a next modification entry, a tag indicator and a forward type entry. The pointer to a next modification entry is an index to a next modification entry for modifying the next IP Multicast data packet for the port.

The egress port forwarding logic may include a Virtual LAN identification table and an intermediate LAN identification table. The intermediate LAN identification table includes an index to a location in the virtual LAN table and the internal LAN table stores a Virtual LAN identification.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
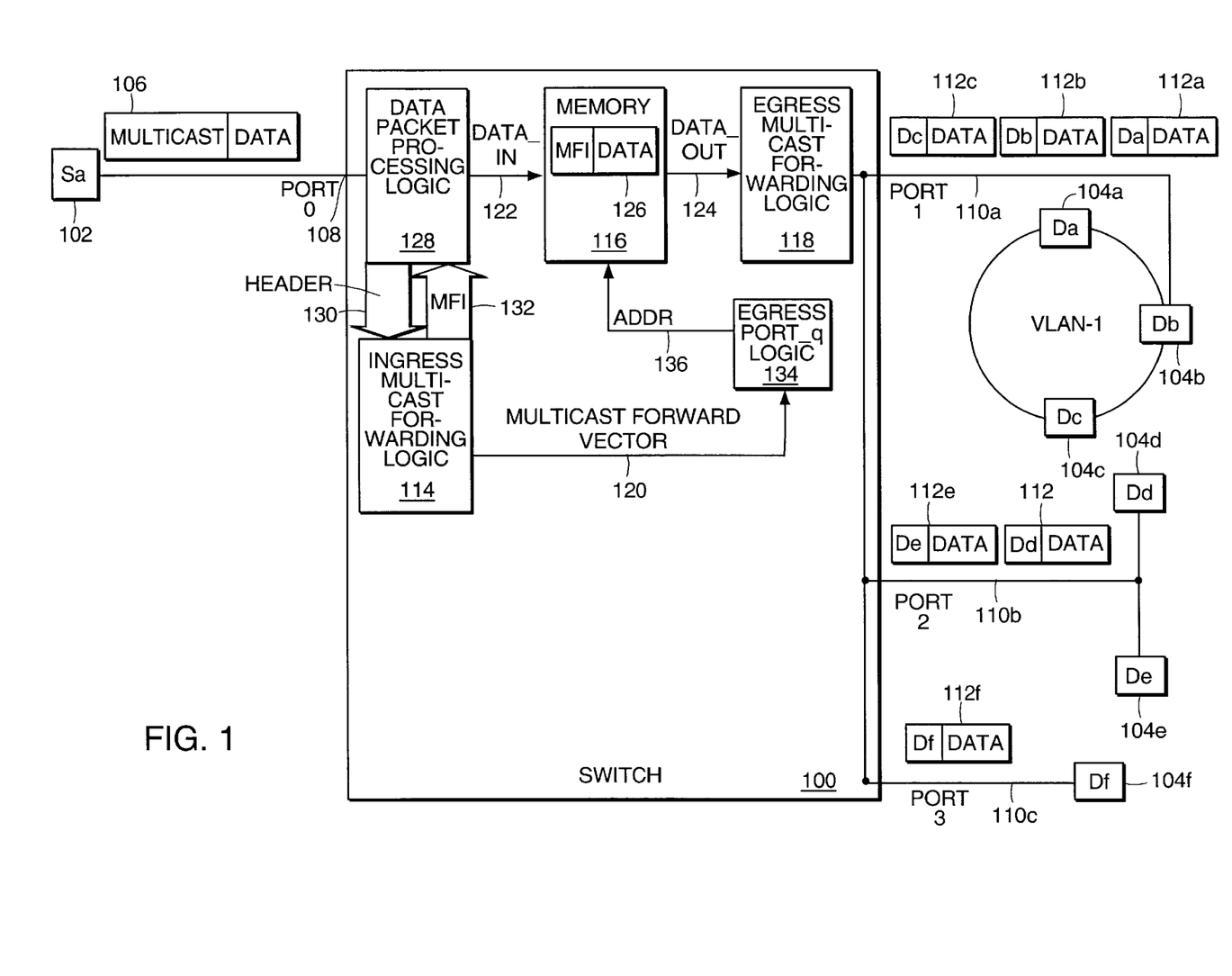
FIG. 1 illustrates a network switch including IP Multicast forwarding logic for forwarding an IP Multicast packet received at an ingress port to members of an IP Multicast group connected to the switch according to the principles of the present invention.

FIG. 1 illustrates the members of an IP Multicast group connected to a network switch 100. The members of the IP Multicast group include destination nodes 104a–f connected to egress ports 110a–c. Source node 102 connected to an ingress port 108 is the source of IP Multicast data packets for the IP Multicast group. For example, the source node 102 may be transmitting a video to all members of the IP Multicast group. In an alternative embodiment source node 102 may be a member of the IP Multicast group. The source node 102 forwards an IP Multicast data packet 106 to the switch 100. The switch 100 forwards a copy of the IP Multicast data packet 106 to each member of the IP Multicast group, that is, destination nodes 104a–f.

The copy of the IP Multicast data packet 106 may be modified by the switch 100 before it is forwarded to each destination node 104. The copy of the received IP Multicast data packet 106 is modified dependent on a modification entry stored in the switch 100. The modification and forwarding of the copy of the received IP Multicast data packet is performed by the switch at wire-speed, that is, the modification is performed without host intervention and the egress Modified IP Multicast data packet 112 is forwarded to a destination node 104 in the next available port cycle for the egress port 110 to which the destination node 104 is connected.

As an IP Multicast data packet 106 is received on an ingress port 108, the data packet processing logic 128 extracts information from the header of the IP Multicast data packet 106 and forwards the extracted information to the ingress Multicast forwarding logic 114. The ingress Multicast forwarding logic 114 determines to which egress ports 110 the destination nodes 104 in the IP Multicast group are connected and forwards a Multicast forward vector 120 to the egress port-q logic 134 indicating the egress ports 110 to which the IP Multicast data packet is to be forwarded. The ingress Multicast forwarding logic 114 also forwards a Multicast Forwarding Index ("MFI") 132 corresponding to the IP Multicast group to which the IP Multicast data packet 106 is to be forwarded, to the data packet processing logic 128. The MFI 132 is an index to a modification entry for each member of the IP Multicast group.

The data packet processing logic 128 forwards the received IP Multicast data packet 106 and the MFI 132 to memory 116. The ingress modified IP Multicast data packet 126 including the MFI 132 is stored in memory 116. The address of the ingress modified IP Multicast data packet 126 is stored in a port queue (not shown) for each egress port 110 on which the IP Multicast data packet 106 is to be forwarded. Port queues are described in co-pending U.S. application Ser. No. 09/386,589, filed on Aug. 31, 1999 entitled "Method and Apparatus for an Interleaved Non-Blocking Packet Buffer" by David A. Brown, the entire teachings of which are incorporated herein by reference.

The MFI 132 stored in the ingress modified IP Multicast data packet 126 is used to access a stored modification entry associated with each member of the IP Multicast group. The egress Multicast forwarding logic 118 modifies a copy of the ingress modified IP Multicast data packet 126 received from memory 116 using the contents of the stored modification entry for the member and forwards an egress modified IP Multicast data packet 112 to each member of the IP Multicast group.

By storing a modification entry for each member of the IP Multicast group, no host processing is required to modify and forward a copy of the IP Multicast data packet 106 to all members of the IP Multicast group. Thus, the IP Multicast data packet is forwarded at wire speed, that is, to a member of the IP Multicast group connected to a port in the next available port cycle for the port. The modification entry associated with each destination node 104 is stored in the egress Multicast forwarding logic 118 and is accessed using the MFI 132 associated with the IP Multicast Group forwarded from the Ingress Multicast forwarding logic 114. The MFI is stored in the ingress modified Multicast data packet 126 in memory 116.

As shown in FIG. 1, the members of the IP Multicast group include destination nodes Da–f 104a–f. Destination nodes Da–c 104a–c are connected to egress port_1 110a, destination nodes Dd–e 104d–e are connected to egress_port 2 110b and destination node Df 104f is connected to egress port_3 100c. All the destination nodes 104a–f in the embodiment shown are terminating nodes but in an alternative embodiment any one of the destination nodes 104a–f shown may be the ingress port of another switch and a copy of the IP Multicast data packet may be forwarded through the other switch to members of the IP Multicast group connected to the other switch's egress ports. Also, there may be multiple VLANs connected to the egress ports of the other switch's egress ports, with each VLAN requiring a modified copy of the IP Multicast data packet.

A data packet 106 transmitted by the source node Sa 102 is received by the network switch 100 at ingress port_1 108. The data packet 106 includes a destination address. If the destination address is an IP Multicast address, the switch 100 forwards a modified copy of the IP Multicast data packet 112 to all members of the IP Multicast group associated with the IP Multicast address connected to the switch 100.

For the IP Multicast group shown, the switch 100 forwards six egress modified IP Multicast data packets 112a–f to egress ports 1–3 110a–c. An egress modified IP Multicast data packet 112 is forwarded to the egress port 110 in the next available port cycle for the egress port 110 after the IP Multicast data packet 106 has been received at the ingress port 102.

Three egress modified IP Multicast data packets 112a–c are forwarded to egress port_1 110a, one to each of destination nodes Da–c 104a–c. Two egress modified IP Multicast data packet 112d–e are forwarded to egress port_2 110b, one to each of destination nodes Dd–e 104d–e. One egress modified IP Multicast data packet 112f is forwarded to egress port_3 110c to destination node Df 104f.

Upon identifying the received IP Multicast data packet 106, the data packet processing logic 128 forwards a portion of the header of the IP Multicast data packet 130 to ingress Multicast forwarding logic 114. The ingress Multicast forwarding logic 114 determines the egress ports_1–3 110a–c to which a copy of the IP Multicast data packet 106 is to be forwarded and generates a Multicast forward vector 120. The Multicast forward vector 120 is forwarded to the egress port_q logic 134. The ingress Multicast forwarding logic 114 selects a stored Multicast Forwarding Index ("MFI") 132 dependent on the portion of the header of the IP Multicast data packet 130 and forwards the MFI 132 to the data packet processing logic 128. The data packet processing logic 128 stores the MFI 132 with the received IP Multicast data packet 106 in the ingress modified IP Multicast data packet 126 and forwards the ingress modified IP Multicast data packet 126 on data-in 122 to memory 116. The ingress modified IP Multicast data packet 126 is stored in memory 116.

At the next port cycle for each of the egress ports_1–3 110a–c, the ingress modified IP Multicast data packet 126 is forwarded from memory 116 on data-out 124 to the egress Multicast forwarding logic 118 dependent on the address 136 forwarded from egress port_q logic 134. The egress Multicast forwarding logic 118 modifies the copy of the ingress modified data packet 126 dependent on the MFI 132 included in the ingress modified data packet 126. The egress modified data packets 112a–f are forwarded on the respective egress ports_1–3 110a–c. After all the egress modified data packets 112a–f have been forwarded, the ingress modified data packet 126 stored in memory 116 may be overwritten.

Figure 2:
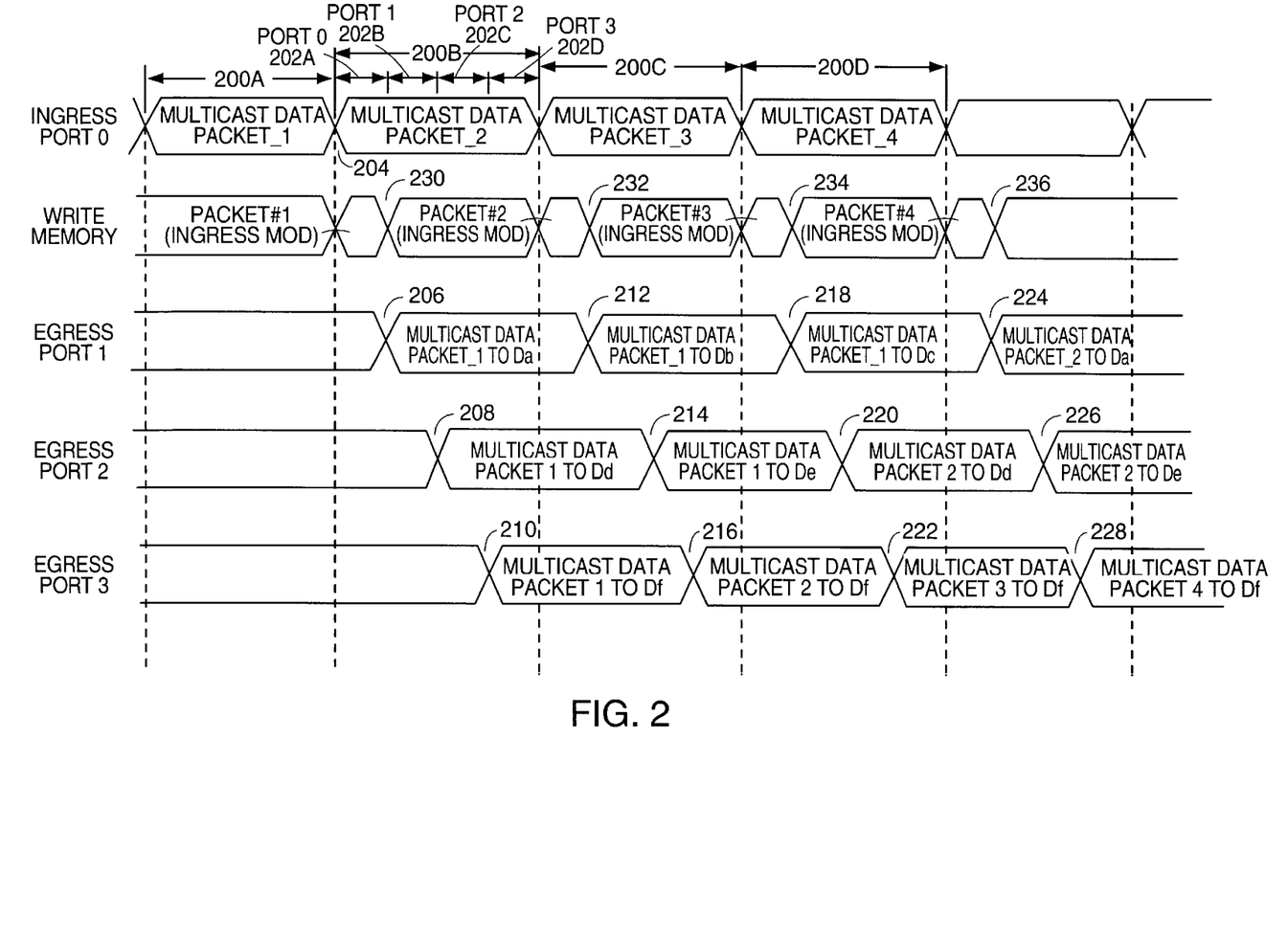
FIG. 2 is a timing diagram illustrating the forwarding of IP Multicast data packets by the switch shown in FIG. 1 to members of the IP Multicast group shown in FIG. 1.

FIG. 2 is a timing diagram illustrating wire speed forwarding of an IP Multicast data packet 106 through the switch 100 to members of the IP Multicast group shown in FIG. 1. FIG. 2 is described in conjunction with FIG. 1. The IP Multicast group shown in FIG. 1 includes six members, Da–Df 104a–f connected to the switch 100. The switch 100 includes four ports, ingress_port 1 108 and egress ports 1–3 110a–b. However, the invention is not limited to four ports or six IP Multicast group members as shown. It is well-known to those skilled in the art that the configuration in FIG. 1 may be expanded to include greater than four ports, and an IP Multicast group with greater than six members.

In the timing diagram, it is assumed that each IP Multicast data packet 106 received at ingress port_1 108 is the minimum data packet size, for example, 64 bytes, for an Ethernet data packet because the memory 116 is 64 bytes wide. However, the invention is not limited to a 64 byte packet size, the number of bytes in the data packet may be greater than the width of the memory 116.

It is also assumed that the 64 byte IP Multicast data packet 106 is received at an ingress port 108 (FIG. 1) during a data segment time slot 200. The data segment time slot 200 as shown includes 4 port cycle time slots 202 one for each port connected to the switch 100 because the switch shown in FIG. 1 includes four ports connected to the switch 100, that is, one ingress port 108 and three egress ports 110a–c. The maximum number of ports supported by the switch 100 is dependent on the minimum port cycle time slot 202 and the maximum data segment time slot 200 and thus is not limited to the four ports shown in FIG. 1. In a switch 100 with greater than four ports the data segment time slot 200 would include a port cycle time slot 202 for each port connected to the switch 100. For example, for an Ethernet data packet, the minimum data packet size is 64 bytes. Thus, the maximum data segment time slot 200 is the time it takes to receive 64 bytes at an ingress port and the minimum port cycle time slot 202 is dependent on the time to access the 64 bytes from memory 116 (FIG. 1). Data segment time slots and port cycle time slots are described in co-pending U.S. application Ser. No. 09/386,589, filed on Aug. 31, 1999 entitled "Method and Apparatus for an Interleaved Non-Blocking Packet Buffer" by David A. Brown, the entire teachings of which are incorporated herein by reference.

A copy of an IP Multicast data packet 106 arriving at ingress port_1 108 is forwarded in the next available port cycle time slot 202 to each member of the IP Multicast group, that is, it is forwarded at wire speed. If only one member of the IP Multicast group is connected to the port the copy of the IP Multicast data packet is forwarded in the next port cycle time slot 202. If more than one member of the IP Multicast group is connected to a port, the next IP Multicast data packet arriving at the ingress port 108 is forwarded after the previous IP Multicast data packet has been forwarded to all members of the IP Multicast group connected to the port.

The timing diagram shows four IP Multicast data packets arriving at ingress port_1 108 from source node-a 102 in data segment time slots 200a–d. The first IP Multicast data packet arrives in data segment time slot 200a. In the second data segment time slot 200b, the IP Multicast data packet is forwarded to egress port_1 110a in port cycle 202b, to egress port_2 110b in port cycle 202c and to egress port_3 110c in port cycle 202d. As the first IP Multicast data packet is being forwarded, the second IP Multicast data packet is being received during data segment time slot 200b.

At time 230, ingress modified IP Multicast data packet_1 126 (FIG. 1) is stored in memory 116 (FIG. 1) and ingress multicast forwarding logic 114 (FIG. 1) has forwarded the multicast forward vector 120 (FIG. 1) for IP Multicast data packet_1 106 (FIG. 1) to egress multicast forwarding logic 118 (FIG. 1).

At time 206, the start of port cycle time slot 202b, a copy of ingress modified IP Multicast data packet_1 126 (FIG. 1) is forwarded from memory 116 (FIG. 1) on data-out 124 (FIG. 1) to egress Multicast forwarding logic 118 (FIG. 1) dependent on the address 136 forwarded from egress port_q logic 134 (FIG. 1). Egress Multicast forwarding logic 118 (FIG. 1) modifies the received copy of ingress modified IP Multicast data packet_1 126 (FIG. 1) dependent on the MFI 132 (FIG. 1). Egress modified IP Multicast data packet_1 112A is forwarded through egress port_1 110A to destination node Da 104a.

At time 208, the start of port cycle time slot 202c, and at time 210, the start of port cycle time slot 202d, a copy of ingress modified IP Multicast data packet_1 126 (FIG. 1) is forwarded from memory 116 (FIG. 1) on data-out 124 (FIG. 1) dependent on the address 136 (FIG. 1) forwarded from egress port_q logic 134 (FIG. 1). The received copy of ingress modified IP Multicast data packet_1 126 (FIG. 1) is modified by egress Multicast forwarding logic 118 (FIG. 1) dependent on the associated MFI 132 (FIG. 1) and forwarded through egress port 2 110b to destination node Dd 104d and egress port 3 110c to destination node Df 104f.

At time 212, a copy of ingress modified IP Multicast data packet_1 126 (FIG. 1) is modified and forwarded to destination node Db 104b (FIG. 1) and at time 218 a copy of ingress modified IP Multicast data packet_1 126 (FIG. 1) is modified and forwarded to destination node Dc 104c connected to egress port_1 110a (FIG. 1). At time 214, a copy of ingress modified IP Multicast data packet_1 126 (FIG. 1) is modified and forwarded to destination node Dd 104d connected to egress port_2 110b (FIG. 1).

At time 232, ingress modified IP Multicast data packet_2 126 (FIG. 1) is stored in memory 116 (FIG. 1) and ingress Multicast forwarding logic 114 (FIG. 1) has forwarded the Multicast forward vector 120 (FIG. 1) for IP Multicast data packet_2 106 (FIG. 1) to egress Multicast forwarding logic 118 (FIG. 1). At time 234, ingress modified IP Multicast data packet_3 126 (FIG. 1) is stored in memory 116 (FIG. 1). At time 236, ingress modified IP Multicast data packet_4 126 (FIG. 1) is stored in memory 116 (FIG. 1).

Only one egress modified IP Multicast data packet_1 112 (FIG. 1) is forwarded to egress port_3 110c because only one member of the IP Multicast group, that is, destination node 104f is connected to egress port_3 110c. Thus, at time 216, in port cycle time slot 202d, egress modified IP Multicast data packet_2 112f is forwarded to egress port_3 110c. At time 222, in port cycle time slot 202d, egress modified IP Multicast data packet_3 112f is forwarded to egress port_3 110C. At time 228, in port cycle time slot 3 202d, egress modified IP Multicast data packet_4 112f is forwarded to egress port_3 110c (FIG. 1).

Thus, IP Multicast data packet_1 106 (FIG. 1) received at ingress port_0 108 (FIG. 1), is forwarded through the switch 100 (FIG. 1) at wire speed without host processing in the next available port cycle time slot 202 to destination nodes 104a–f (FIG. 1) connected to egress ports_1–3 110a–c (FIG. 1).

Egress modified IP Multicast data packet_2 112 (FIG. 1) is forwarded on egress port_2 110b to destination node De 104e and destination node Dd 104d. At time 220, egress modified IP Multicast data packet_2 112d is forwarded to destination node Dd 104d connected to egress port_2 110b. At time 226, egress modified IP Multicast data packet_2 112e (FIG. 1) is forwarded to destination node De 104e connected to egress port_2 110b.

At time 224, after the last egress modified IP Multicast data packet_1 112 (FIG. 1) has been forwarded, the location in memory storing ingress modified IP Multicast data packet_1 126 (FIG. 1) may be used to store another data packet received at the ingress port 108 (FIG. 1). Thus, the ingress modified IP Multicast data packet 126 (FIG. 1) received at the ingress port 108 (FIG. 1) is stored in memory 116 (FIG. 1) until egress modified IP Multicast data packet 112 (FIG. 1) has been forwarded to all members of the IP Multicast group.

To determine if all egress modified IP Multicast data packets 112a–f (FIG. 1) have been forwarded, the number of port queues (not shown) that the ingress modified IP Multicast data packet 126 (FIG. 1) has been queued on associated with each ingress modified IP Multicast data packet 126 (FIG. 1) is stored in a port queue counter register (not shown). The counter register is decremented each time all egress modified IP Multicast data packets 112 (FIG. 1) associated with an egress port 110 (FIG. 1) have been forwarded to the egress port 110 (FIG. 1). For example, the port queue count is decremented after one egress modified IP Multicast data packet has been forwarded on egress port_3 110c. The number of port queues is determined from the Multicast forward vector 120 (FIG. 1).

The prior art data packet received on ingress port 108 (FIG. 1) is described in conjunction with FIGS. 3A–3D in order to describe the modifications that the forwarding logic 114, 118 (FIG. 1) and data packet processing logic 126 (FIG. 1) may perform on an IP Multicast packet 106 (FIG. 1) before egress modified IP Multicast data packets 112a–f (FIG. 1) are forwarded to egress ports 110a–c.

Figure 3A:
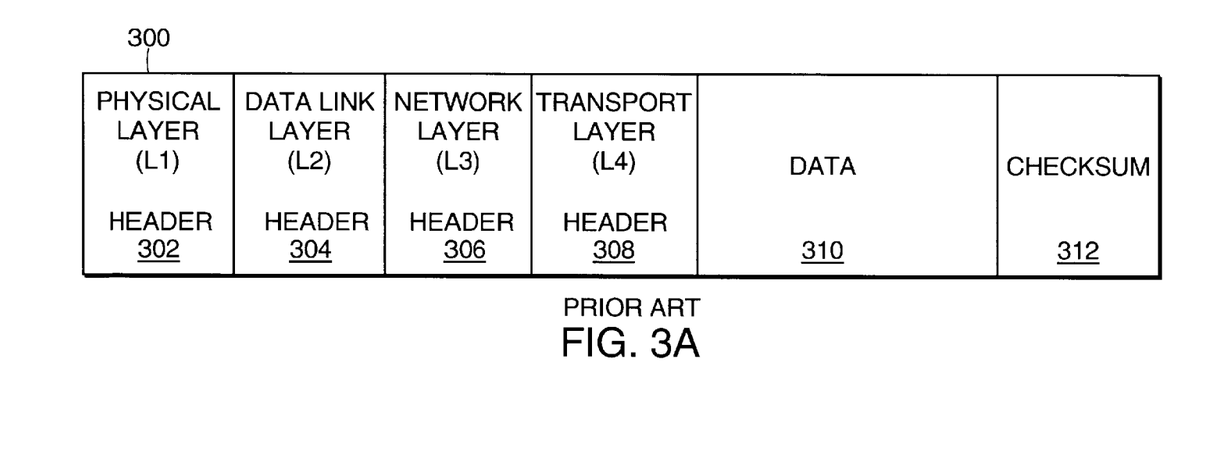
FIG. 3A illustrates a prior art data packet which may be received on an ingress port connected to a switch.
Figure 3B:
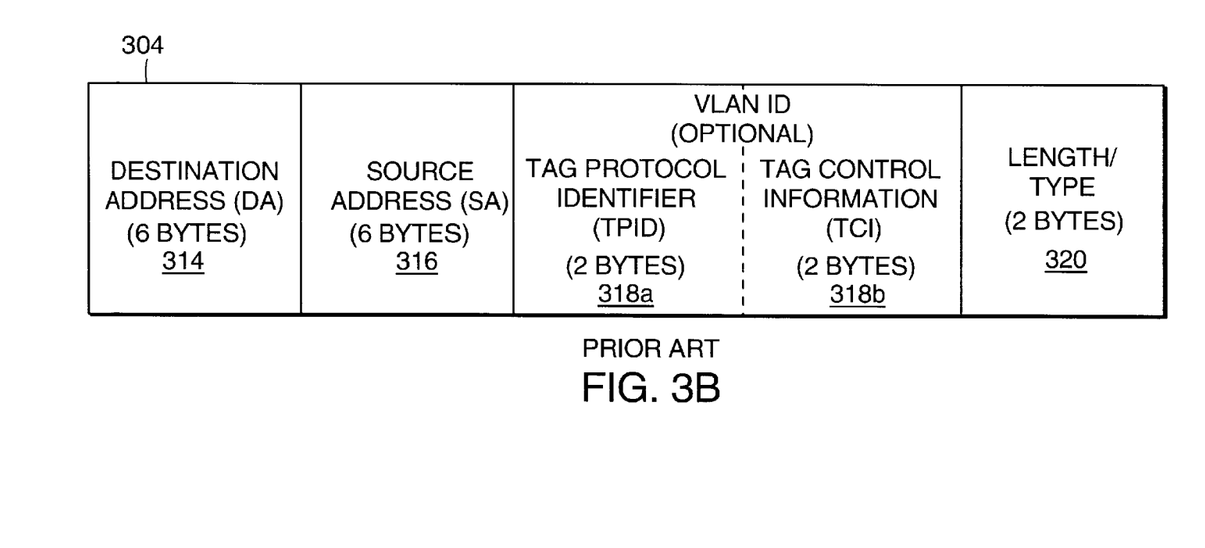
FIG. 3B illustrates a prior art Ethernet Data link layer (L2) header which may be included in the data packet shown in FIG. 3A.
Figure 3C:
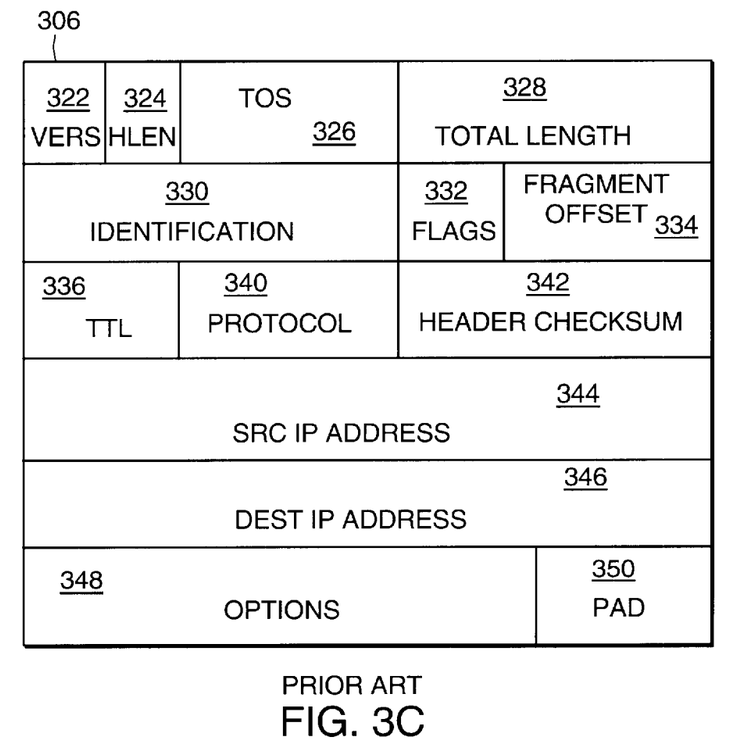
FIG. 3C illustrates a prior art Internet Protocol (Network layer (L3)) header which may be included in the data packet shown in FIG. 3A.
Figure 3D:
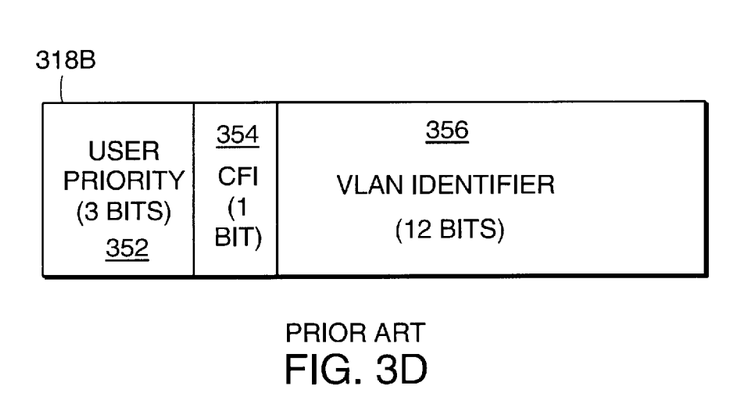
FIG. 3D illustrates the prior art Tag Control Information shown in FIG. 3B.

FIG. 3A illustrates a prior art data packet which may be received on an ingress port 108 (FIG. 1) connected to the switch 100 (FIG. 1). FIG. 3B illustrates a prior art Ethernet header which may be included in the data packet shown in FIG. 3A. FIG. 3C illustrates a prior art Internet Protocol header which may be included in the data packet shown in FIG. 3A. FIG. 3D illustrates the prior art Tag Control Information field 318B in the Ethernet header shown in FIG. 3B.

FIG. 3A shows a prior art data packet 300. The data packet 300 includes a data field 310 and headers for networking layers 302, 304, 306, 308. Headers for four of the layers in the OSI model are shown, the physical layer (L1) header 302, the data link layer (L2) header 304, the networking layer (L3) header 306 and the transport layer (L4) header 308. For example, the data link layer (L2) header 304 may be Ethernet and the networking layer (L3) header 306 may be Internet Protocol ("IP"). The data packet 300 also includes a checksum 312.

FIG. 3B illustrates the format of an Ethernet data link (L2) header 304. The Ethernet data link (L2) header 304 includes a device address for the destination node 104 (FIG. 1), that is, the destination address 314, and a device address for the source node 102 (FIG. 1), that is, the source address 316, an optional Virtual Local Area Network Identification ("VLAN ID") field 318 and a length/type field 320. The VLAN ID 318 includes a Tag Protocol Identifier ("TPI") field 318A and a Tag Control Information ("TCI") field 318B. The VLAN ID field 318 provides support for VLAN switching based on IEEE 802.1Q tagging and IEEE 802.ID 1988 (802.1p) priority levels.

FIG. 3C illustrates the format of an IP network layer (L3) header 306. The IP network layer (L3) header 306 includes a network address for the source node 102 (FIG. 1), that is, the source IP address 344, and a network address for the destination node 104 (FIG. 1), that is, the IP destination address 346. Other fields in the IP network layer header 306 include Version 322, HLEN 324, Type of Service ("TOS") 326, Total Length 328, Identification 330, Flags 332, Fragment Offset 334, Time to Live ("TTL") 336, Protocol 340, Header Checksum 342, Options 348 and pad 350.

An IP Multicast data packet 106 (FIG. 1) received at the ingress port 108 (FIG. 1) connected to the switch 100 (FIG. 1) is bridged to one or more egress ports 110a–c (FIG. 1) dependent on the destination address 314 (FIG. 3B) stored in the Ethernet data link (L2) header 300 (FIG. 3A) or is routed to one or more egress ports 110 (FIG. 1) dependent on the IP destination address 346 stored the IP network layer (L3) header 306.

FIG. 3D illustrates the prior art TCI field 318b shown in FIG. 3B. The TCI field 318b includes a 3-bit user priority field 352, a 1-bit CFI field 354 and a 12-bit Virtual Local Area Network ("VLAN") identifier 356.

Returning to FIG. 1, the data packet processing logic 128 determines if a data packet received at ingress port_1 108 is an IP Multicast data packet 106 by examining the network layer (L3) header 306 (FIG. 3A) included in the received data packet. The network layer (L3) header 306 (FIG. 3A) is an Internet Protocol Version 4 ("IPv4") header if the protocol field 340 (FIG. 3C) is IP, the version field 322 (FIG. 3C) is IPv4 and the header checksum 342 (FIG. 3C) is valid. The IP data packet is an IP Multicast data packet 106 if the IP destination address 346 (FIG. 3C) is class D, that is, the high order four bits of the IP destination address 346 (FIG. 3C) are set to 1110.

If the data packet processing logic 128 determines that the data packet is an IP Multicast data packet 106, a portion of the headers of the IP Multicast data packet 130 including the IP Destination address 346 (FIG. 3C) and IP Source address 344 (FIG. 3C) in the IP networking layer (L3) header 306 (FIG. 3C), the VLAN ID 318 (FIG. 3B) in the Ethernet data link (L2) header 304 (FIG. 3B), and the ingress port number corresponding to the ingress port 108 (FIG. 1) are forwarded to the Ingress Multicast Forwarding Logic 114.

Figure 4:
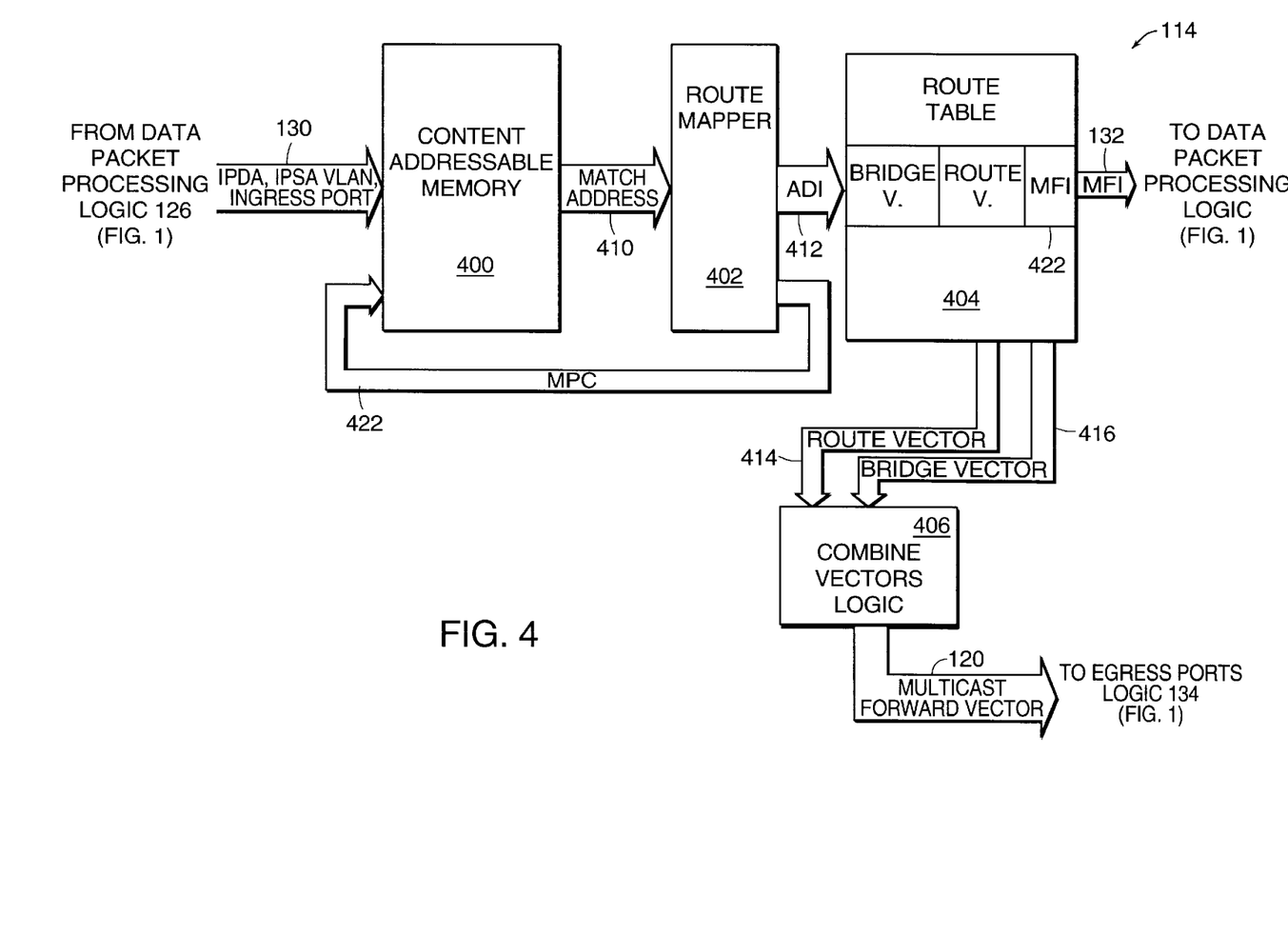
FIG. 4 illustrates the ingress IP Multicast forwarding logic shown in FIG. 1.

FIG. 4 illustrates the ingress Multicast forwarding logic 114 shown in FIG. 1. The ingress Multicast forwarding logic 114 includes a Content Addressable Memory ("CAM") 400, a route mapper 402, a route table 404 and combine vector logic 406. The route table 404 includes a Multicast forwarding entry 422 corresponding to the IP Multicast Group included in the IP Multicast data packet 106 (FIG. 1) received at ingress port_1 108 (FIG. 1). The CAM 400 and the route mapper 402 select a Multicast forwarding entry 422 dependent on the portion of the headers of the IP Multicast data packet 130 (FIG. 1) and the port number for ingress port_1 108 (FIG. 1) forwarded from the data packet processing logic 128 (FIG. 1).

In the implementation of the Ingress Multicast forwarding logic 114 (FIG. 1) described in conjunction with FIG. 4, the CAM 400 is not sufficiently wide to store the IP Destination Address 346 (FIG. 3C), IP Source Address 344 (FIG. 3C), ingress port number and VLAN ID 318 (FIG. 3B). Thus, the route mapper 402 is implemented to increase the width of the CAM 400. However, it is well known by those skilled in the art that the CAM 400 may be expanded to include the Route Mapper 402.

The search for the Multicast Forwarding entry 422 in the Route Table 404 corresponding to the IP Multicast packet 106 is performed in two stages. First, the CAM 400 is searched for an entry dependent on the IP destination address 346 (FIG. 3C) and the IP Source Address 344 (FIG. 3C) fields in the IP network layer (L3) header 306 (FIG. 3C). If a matching entry is found in the CAM 400, a match address 410 is forwarded to the route mapper 402. The route mapper 402 forwards a Multicast Path Code ("MPC") 422 corresponding to the match address 410 to the CAM 400.

Second, the CAM 400 is searched for an entry dependent on the MPC 422, the VLAN ID 318 (FIG. 3B) and the ingress port number. If a matching entry is found in the CAM 400, a match address 410 is forwarded to the route mapper 402. The route mapper 402 forwards an Associated Data Index ("ADI") corresponding to the match address 410 to the route table 404. An IP Multicast forwarding entry 422 is stored at a location in the route table 404 identified by the ADI 412. The IP Multicast forwarding entry 422 identifies the IP Multicast group to which the IP Multicast data packet 106 (FIG. 1) is to be forwarded by the switch 100 (FIG. 1).

The CAM 400 is searched with the IP source address 344 (FIG. 3C), the IP destination address 346 (FIG. 3C), the VLAN ID 318 (FIG. 3B) and the ingress port number 108 (FIG. 1) in order to prevent duplicating forwarding of the IP Multicast data packet. For example, if a source node is connected to more than one port, that is, destination node x is connected to port y and port z and an IP Multicast data packet is received from destination node x on port y, the data packet is forwarded to all members of the IP Multicast group. However, if the IP Multicast data packet is received from destination address x on port z it is discarded because destination x is connected to more than one port and thus the IP Multicast data packet received on port z is a duplicate of the IP Multicast data packet received on port y.

Each Multicast forwarding entry 422 in the Route Table 404 includes a bridge vector 416, a route vector 414 and a Multicast Forwarding Index 132 ("MFI"). The bridge vector 416 and route vector 414 are forwarded to combine vectors logic 406. The MFI 132 is forwarded to the data packet processing logic 128 (FIG. 1).

The combine vector logic 406 generates a Multicast forward vector 120 by performing a logical OR function on the route vector 414 and the bridge vector 416. The Multicast forward vector 120 is forwarded to the egress port_q logic 134 (FIG. 1). The Multicast forward vector 120 selects one or more egress ports to which the IP Multicast data packet 106 (FIG. 1) is to be forwarded.

The first three bytes of the destination address 314 (FIG. 3B) in the Ethernet data link (L2) header 304 (FIG. 3B) of the IP Multicast data packet 106 (FIG. 1) received at ingress port_1 108 are set to "0x01-00-5E". Before the IP Multicast data packet 106 is forwarded on data-in 122 (FIG. 1) to memory 116 (FIG. 1), the data packet processing logic 128 (FIG. 1) writes the MFI 132 forwarded from ingress Multicast logic 114 (FIG. 1) into the second and third bytes of the destination address 314 (FIG. 3B) as follows: "0x01-0M-F1". The ingress modified IP Multicast data packet 126 (FIG. 1) is stored in memory 116 (FIG. 1). Egress Multicast forwarding logic 118 (FIG. 1) uses the MFI 132 included in the ingress modified IP Multicast data packet 126 (FIG. 1) to modify the ingress modified IP Multicast data packet 126 (FIG. 1) before forwarding an egress modified IP Multicast data packet 112 (FIG. 1) to an egress port 110 (FIG. 1).

The IP Multicast forward vector 120 determines to which egress ports 110a–c (FIG. 1) the IP Multicast data packet 106 (FIG. 1) is to be forwarded. The location of the ingress modified Multicast data packet 126 (FIG. 1) in memory 116 (FIG. 1) is stored on an egress port queue (not shown) in egress port_q logic 134 (FIG. 1) dependent on the state of a corresponding egress port queue bit (not shown) implemented in the ingress multicast forwarding logic 114 shown in FIG. 1 in the Multicast forward vector 120.

Figure 5:
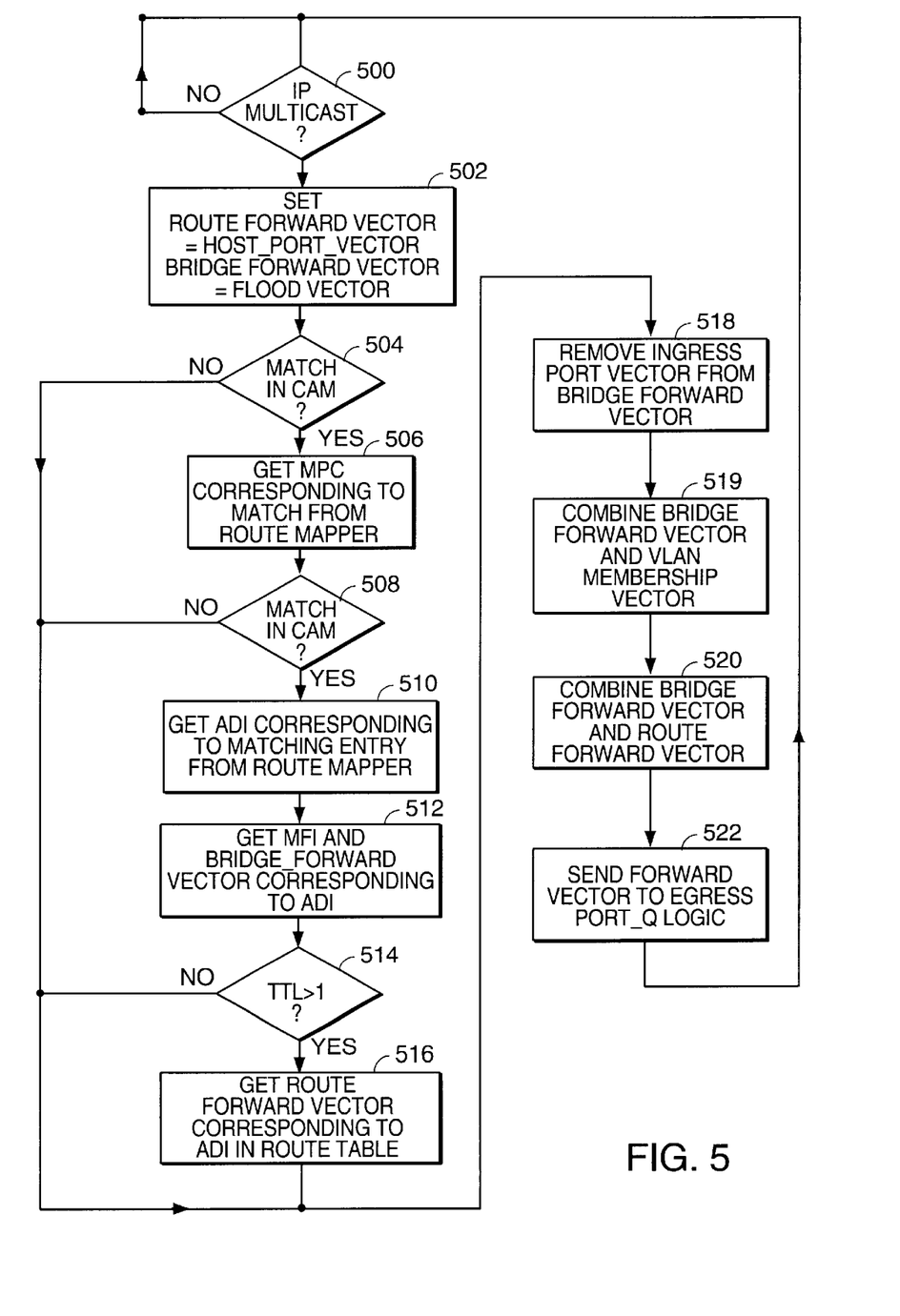
FIG. 5 is a flowchart of the method for processing an IP Multicast data packet received on an ingress port.

FIG. 5 is a flowchart of the method implemented in the ingress multicast forwarding logic 114 shown in FIG. 4 for processing an IP Multicast data packet 106 (FIG. 1) received at an ingress port 108 (FIG. 1). The method is described in conjunction with FIGS. 1–4.

At step 500, the ingress multicast forwarding logic 114 (FIG. 1) receives a portion of the IP Multicast data packet 130 from the data packet processing logic 128 (FIG. 1). Processing continues with step 502.

At step 502, the ingress Multicast forwarding logic 114 (FIG. 4) initializes the route vector 414 (FIG. 4) and the bridge vector 416 (FIG. 4) in the combine vectors logic 406 (FIG. 4).

At step 504, a search is performed in the CAM 400 (FIG. 4) for an entry matching the IP destination address 346 (FIG. 3C) and the IP source address 344 (FIG. 3C) forwarded to the CAM 400 (FIG. 4) from the data packet processing logic 128 (FIG. 1). If a match address 410 (FIG. 4) is found in the CAM 400 (FIG. 4), processing continues with step 506. If not, processing continues with step 518.

At step 506, the match address 410 (FIG. 4) is forwarded to the route mapper 402 (FIG. 4). The route mapper 402 (FIG. 4) forwards a Multicast Path Code ("MPC") 422 (FIG. 4) corresponding to the match address 410 (FIG. 4) to the CAM 400 (FIG. 4). Processing continues with step 508.

At step 508, a second search is performed in the CAM 400 (FIG. 4) for an entry dependent on the MPC 422, and the VLAN ID 318 (FIG. 3B) from the Ethernet data link (L2) header 304 (FIG. 3B) and ingress port number. If a match address 410 (FIG. 4) is found in the CAM 400 (FIG. 4) processing continues with step 510. If not, processing continues with step 518.

At step 510, the match address 410 (FIG. 4) is forwarded to the route mapper 402 (FIG. 4). The route mapper 402 (FIG. 4) forwards an ADI corresponding to the match address 410 (FIG. 4) to the route table 404. The IP Multicast forwarding entry 422 (FIG. 4) for the IP Multicast data packet 106 (FIG. 1) is stored at a location in the route table 404 identified by the ADI 412. Processing continues with step 512.

At step 512, the MFI 132 (FIG. 4) stored in the Multicast Forwarding entry 422 (FIG. 4) is forwarded to data packet processing logic 128 (FIG. 1) and the bridge vector 416 (FIG. 4) stored in the Multicast forwarding entry 422 (FIG. 4) is forwarded to the combine vectors logic 406 (FIG. 4). Processing continues with step 514.

At step 514, if the TTL field 336 (FIG. 3C) in the IP network layer (L3) header 306 (FIG. 3C) in the IP Multicast data packet 106 (FIG. 1) forwarded to the ingress Multicast forwarding logic 114 (FIG. 1) on the portion of the IP Multicast data packet 130 (FIG. 1) is greater than one processing continues with step 516. If not, processing continues with step 518.

At step 516, the route vector 414 (FIG. 4) stored in the Multicast forwarding entry 422 (FIG. 4) is forwarded to the combine vectors logic 406 (FIG. 4). Processing continues with step 518.

At step 518, the ingress port number corresponding to the ingress port 108 (FIG. 1) at which the IP Multicast data packet 106 (FIG. 1) was received is removed from the bridge vector 416 (FIG. 4). Processing continues with step 519.

At step 519, the bridge vector 416 (FIG. 4) and a VLAN membership vector (not shown) are combined. Processing continues with step 520.

At step 520, the bridge vector 416 (FIG. 4) and the route vector 414 (FIG. 4) are combined by performing a logical OR function to provide a Multicast forward vector 120 (FIG. 4) for the IP Multicast group. Processing continues with step 522.

At step 522, the Multicast forward vector 422 is forwarded to the egress port_q logic 134 (FIG. 1).

If no matching entry is found in the CAM 400 (FIG. 4) for the IP Multicast data packet 106 (FIG. 1), that is, the IP Multicast group is unknown, the Multicast data packet 106 (FIG. 1) is forwarded to the host port (not shown) so that the host port may add an entry for the IP Multicast group in the CAM 400 (FIG. 4), Route Mapper 402 (FIG. 6) and Route Table 404 (FIG. 4). The Multicast forward vector 422 (FIG. 4) is selected so that the IP Multicast packet 106 is forwarded (FIG. 1) to the host port. The Multicast forward vector 422 (FIG. 4) is also selected so that the IP Multicast data packet 106 (FIG. 1) for the unknown IP Multicast group is bridged to the VLAN on which the IP Multicast data packet 106 (FIG. 1) was received.

Figure 6:
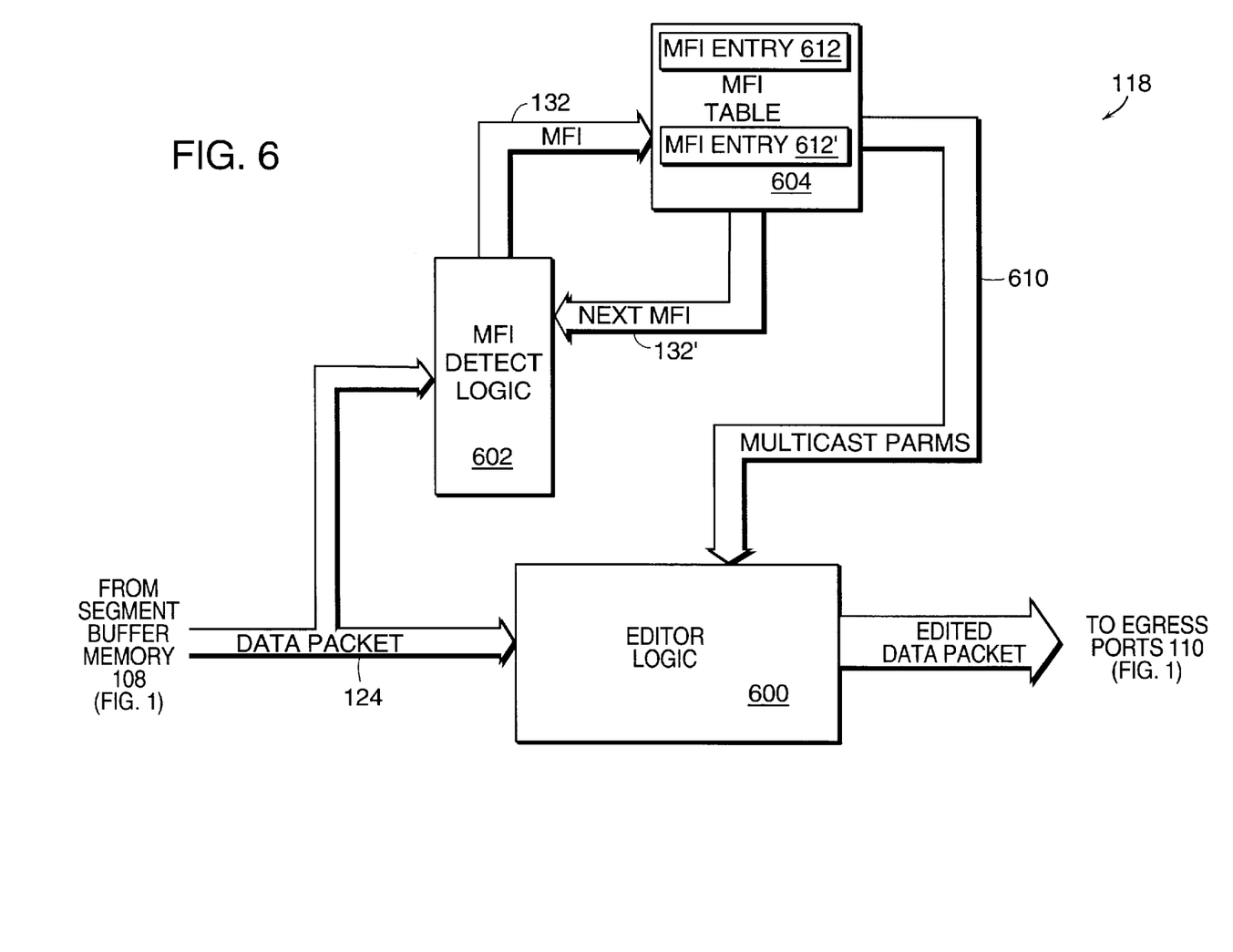
FIG. 6 illustrates the egress multicast forwarding logic shown in FIG. 1.

FIG. 6 illustrates the egress Multicast forwarding logic 118 shown in FIG. 1. The Egress Multicast forwarding logic 118 (FIG. 1) includes MFI detect logic 602, editor logic 600 and an MFI table 604. The MFI table 604 includes an MFI entry 612.

As a copy of an ingress modified IP Multicast data packet 126 (FIG. 1) stored in memory 116 (FIG. 1) forwarded on data-out 124 (FIG. 1) is received by the egress Multicast forwarding logic 118, the MFI detect logic 602 detects the MFI 132 included in the ingress modified IP Multicast data packet 126 (FIG. 1) and forwards the MFI 132 to the MFI Table 604. The MFI 132 is an index to the MFI entry 612 in the MFI table 604 corresponding to the IP Multicast group. The MFI entry 612 determines to which egress ports 110 (FIG. 1) the first copy of the IP Multicast data packet 106 (FIG. 1) is to be forwarded. If a subsequent IP Multicast data packet 106 is to be forwarded on an egress port 110, a next MFI 132' is included in the MFI entry 612 in the MFI table 604. The next MFI 132' is forwarded to the MFI detect logic 602 to select the next MFI entry 612. For example, a next MFI 132' is stored with the MFI entry 612 for egress modified IP Multicast data packet 112a (FIG. 1) to select the next MFI entry 612' for egress modified IP Multicast data packet 112b (FIG. 1).

The ingress modified IP Multicast data packet 126 (FIG. 1) is modified by the editor logic 600 dependent on Multicast parameters 610 included in the MFI entry 612. Multicast parameters 610 stored in the MFI entry 612 are forwarded to the editor logic 600. Thus, each ingress modified IP Multicast data packet 126 (FIG. 1) is edited dependent on the destination node 104a–f (FIG. 1) to which it is being forwarded. By providing an MFI entry 612 in the MFI table 604, the ingress modified IP Multicast data packet 126 (FIG. 1) may be edited to provide an egress modified IP Multicast data packet 112 (FIG. 1) and forwarded at wire speed to each member of the IP Multicast group connected to an egress port 110a–c (FIG. 1).

Figure 7:
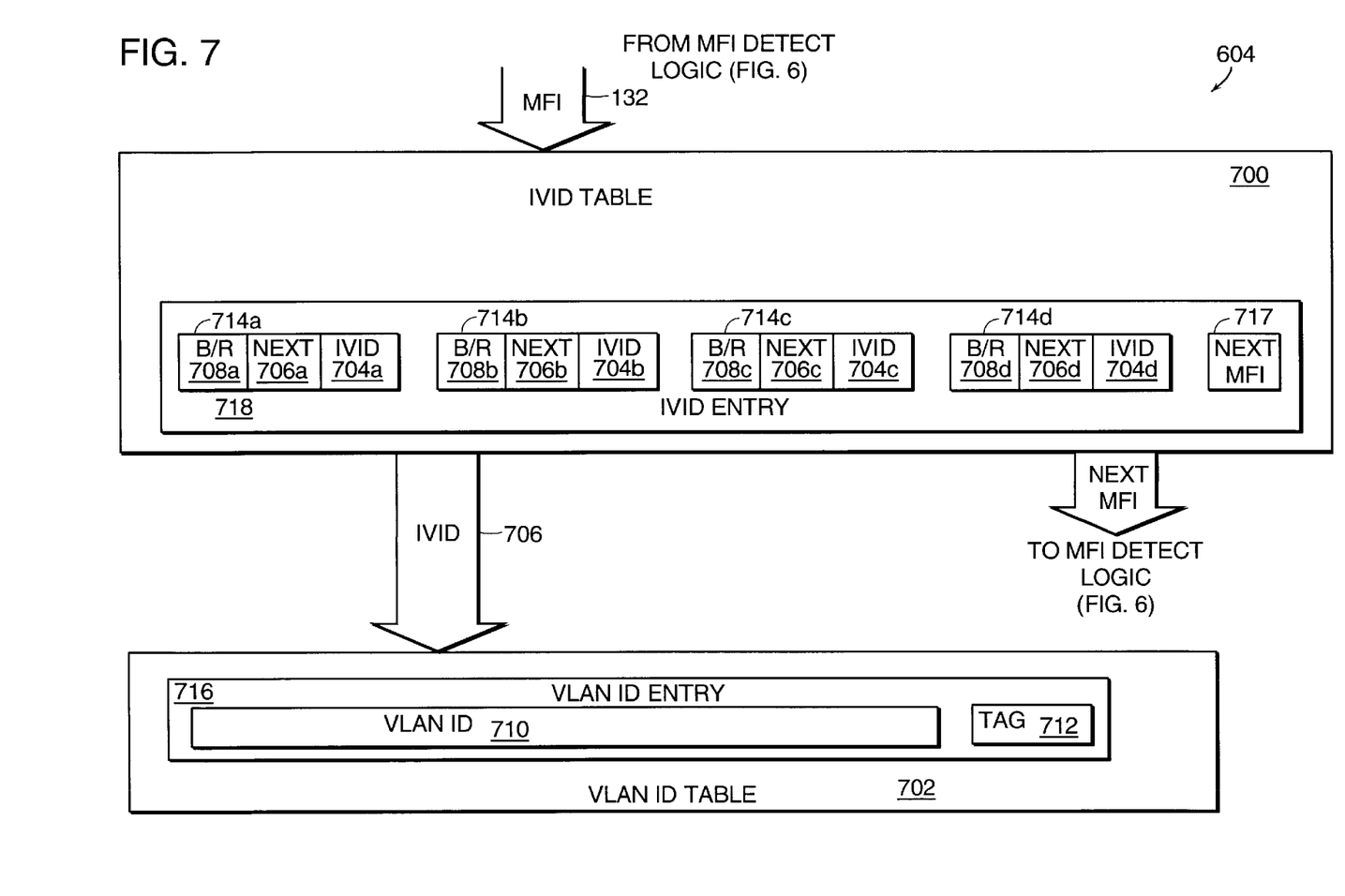
FIG. 7 illustrates the Multicast Forwarding Index table shown in FIG. 6.
Figure 8:
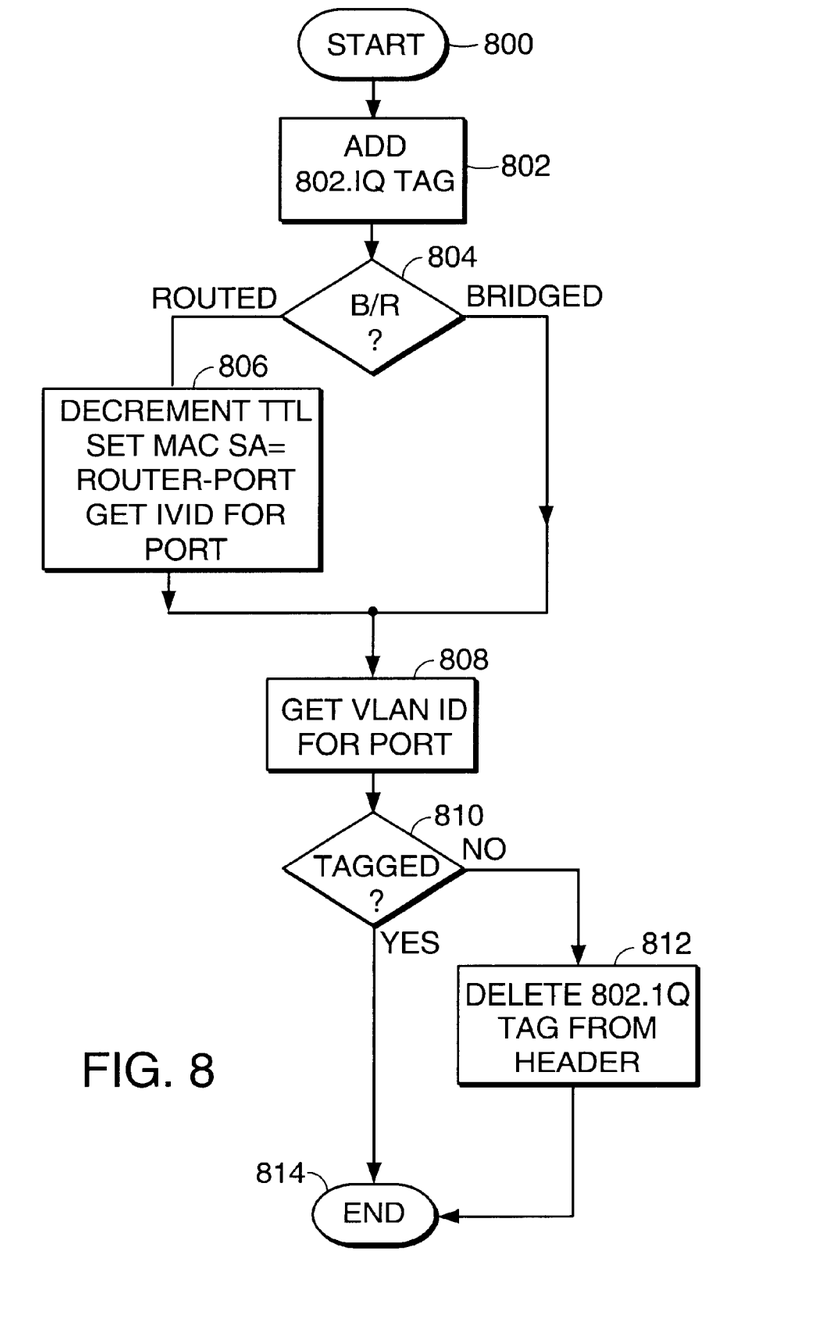
FIG. 8 is a flowchart of the steps performed in the egress multicast forwarding logic shown in FIG. 6 for modifying the IP Multicast data packet.

FIG. 7 illustrates the MFI table 604 shown in FIG. 6 for a switch 100 with four ports as shown in FIG. 1. The MFI table 604 (FIG. 6) includes an IVID table 700 and a VLAN ID table 702. An MFI entry 612' includes an IVID entry 718 in the IVID table 700 and a VLAN ID entry 716 in the VLAN ID table 702. An IVID entry 718 in the IVID table 700 includes a port field 714a–d for each port connected to the switch 100 (FIG. 1). The switch 100 as shown in FIG. 1 includes four ports: ingress port_1 108 and egress ports_ 1–3 110a–c.

Each port field 714 includes a Bridge/Route field 708, a Next field 706 and an IVID field 704. The IVID entry 718 also includes a next MFI field 717. The next MFI field 717 stores a next MFI 132' if any next field 706a–d in the IVID entry 718 indicates that another egress modified IP Multicast data packet 112 (FIG. 1) is to be forwarded to a port connected to the switch 100. (FIG. 1) The IVID entry 718 as shown is for a switch 100 (FIG. 1) with four ports, as shown in FIG. 1. The number of port fields 714 is not limited to the four shown, a port field 714 is provided for each port connected to the switch 100 (FIG. 1). For example, for a switch with sixty-four ports, the IVID entry 718 includes sixty four port fields 714.

The IVID field 704 stores an index to a VLAN ID entry 716 in the VLAN ID table 702 corresponding to the IVID field 704 if there is a valid VLAN ID entry 716 for the port. The VLAN ID entry 716 in the VLAN ID table 702 includes a VLAN ID field 710 and a Tag field 712.

In an alternate embodiment the IVID entry 718 in the IVID Table 700 may include the VLAN ID field 710 and tag field 712 stored in the VLAN ID entry 716, in which case the IVID field 704 would not be required. However, storing the IVID entry 718 and the VLAN ID entry 716 separately, that is, in the IVID table 700 and the VLAN ID table 702 reduces the total memory required to implement the MFI table 604 (FIG. 6) because every ingress modified IP Multicast data packet 126 may not have a corresponding VLAN ID entry 716.

The Bridge/Route field 708 is implemented as a single bit. The state of the Bridge/Route field 708 determines whether the ingress modified IP Multicast data packet 126 (FIG. 1) is to be bridged or routed to a port. The Next field 706 is implemented as a single bit. The state of the next field 706 determines whether another egress modified IP Multicast data packet 112 (FIG. 1) is to be forwarded on the port. The IVID field 704 provides an index to the VLAN ID table 702. The number of bits in the IVID field 704 is dependent on the size of the VLAN ID table 702. For example, for a VLAN ID Table 706 with 256 VLAN ID entries 716 the VLAN ID index 714 includes eight bits.

The VLAN ID 710 contains a valid VLAN ID 710 if the ingress modified IP Multicast Data packet 126 (FIG. 1) is to be routed to the port. If the Tag field 712 indicates that the egress modified IP Multicast data packet 112 (FIG. 1) is not tagged, the editor logic 600 FIG. 6) deletes the tag 318b (FIG. 3B) from the VLAN ID 318 (FIG. 3B) in the Ethernet data link layer (L2) header 304 (FIG. 3B).

Having determined that a VLAN ID 710 is required and obtaining the VLAN ID 710 from the VLAN ID table 702, the Multicast parameters 610 (FIG. 6) are forwarded to the editor logic 600 (FIG. 6). The editor logic 600 (FIG. 6) uses the Multicast parameters 610 to modify the ingress modified IP Multicast data packet 126 (FIG. 6), and after modifying the editor logic 600 (FIG. 6) forwards the egress modified IP Multicast data packet 112 to the egress port 110 (FIG. 1).

If the Bridged/Routed field 708 in the port field 714 is set to bridge, the editor logic 600 (FIG. 6) adds or removes the VLAN ID 318 (FIG. 3C) and restores the destination address 314 (FIG. 3B) in the Ethernet data link layer (L2) header 304 (FIG. 3B) to its original value.

If the Bridged/Routed field 708 in the port field 714 is set to routed, the editor logic 600 (FIG. 6) overwrites the router's source address in the source address 316 (FIG. 3B) in the Ethernet data link layer (L2) header 304 (FIG. 3B), decrements the TTL 336 (FIG. 3C) and generates an IP check sum and stores it in header checksum 342 (FIG. 3C). The editor logic 600 (FIG. 6) also restores the destination address 314 (FIG. 3B) in the Ethernet data link layer (L2)

header 304 (FIG. 3B) to the original value and adds the TCI 318b (FIG. 3B) tag.

The egress Multicast forwarding logic 118 (FIG. 1) forwards the egress modified IP Multicast data packet 112a–f (FIG. 1) to the egress ports 110a–c (FIG. 1).

While this invention has been particularly shown and described with references to preferred embodiments thereof, it will be understood by those skilled in the art that various changes in form and details may be made therein without departing from the scope of the invention encompassed by the appended claims.

What is claimed is:

1. A switch comprising:
    a memory storing a multicast data packet received from an ingress port; and
    egress port forwarding logic, the egress port forwarding logic comprising:
        a table of modification entries including a modification entry for each member of a multicast group associated with the multicast data, a plurality of the members of the multicast group coupled to a same egress port, an index to the table of modification entries for the multicast group stored with the data packet in the memory; and
        editing logic which modifies a copy of the multicast data packet received from the memory dependent on the modification entry associated with the member.

2. The switch as claimed in claim 1 further comprising:
    ingress port forwarding logic which generates a multicast forward vector for the multicast data packet, the multicast forward vector indicating to which ports the stored multicast data packet is to be forwarded.

3. The switch as claimed in claim 2 further comprising:
    port queue logic which stores a pointer to the multicast data packet stored in the memory in at least one port queue dependent on the multicast forward vector.

4. A switch comprising:
    a memory storing a multicast data packet received from a port connected to the switch;
    egress port forwarding logic, the egress port forwarding logic comprising:
        a table of modification entries including a modification entry for each member of a multicast group associated with the multicast data packet, an index to the table of modification entries for the multicast group stored with the data packet in the memory; and
        editing logic which modifies a copy of the multicast data packet received from the memory dependent on the modification entry;
        ingress port forwarding logic which generates a multicast forward vector for the multicast data packet, the multicast forward vector indicating to which ports the stored multicast data packet is to be forwarded; and
        port queue logic which stores a pointer to the multicast data packet stored in the memory in at least one port queue dependent on the multicast forward vector, the port queue logic removes the pointer to the multicast data packet stored in the port queue after the stored multicast data packet has been forwarded to all members of the multicast group connected to the port associated with the port queue.

5. A switch comprising:
    a memory storing a multicast data packet received from a port connected to the switch;
    egress port forwarding logic, the egress port forwarding logic comprising:
        a table of modification entries including a modification entry for each member of a multicast group associated with the multicast data packet, an index to the table of modification entries for the multicast group stored with the data packet in the memory, the modification entry comprises:
            a virtual LAN identification;
            a pointer to a next modification entry;
            a tag indicator; and
            a forward type indicator; and
        editing logic which modifies a copy of the multicast data packet received from the memory dependent on the modification entry.

6. The switch as claimed in claim 5 wherein the pointer to next modification entry is an index to a next modification entry for modifying a next copy of the multicast data packet.

7. A switch comprising:
    a memory storing a multicast data packet received from a port connected to the switch;
    egress port forwarding logic, the egress port forwarding logic comprising:
        table of modification entries including a modification entry for each member of a multicast group associated with the multicast data packet an index to the table of modification entries for the multicast group stored with the data packet in the memory the modification entry comprises:
            a virtual LAN entry stored in a virtual LAN identification table; and
            an intermediate entry stored in an intermediate LAN identification table wherein the intermediate entry includes an index to the virtual LAN entry; and
        editing logic which modifies a copy of the multicast data packet received from the memory dependent on the modification entry.

8. A method for forwarding a multicast data packet in a switch comprising the steps of:
    storing in a memory, the multicast data packet received from an ingress port;
    storing table of modification entries including a modification entry for each member of a multicast group associated with the multicast data packet, a plurality of members of the multicast group coupled to a same egress port;
    modifying a copy of the multicast data packet received from the memory dependent on the modification entry associated with the member; and
    forwarding the modified copy of the multicast data packet to the egress port in a next available egress port cycle time.

9. The method for forwarding multicast packets in a switch as claimed in claim 8 further comprising the step of:
    selecting a multicast forward vector for the multicast data packet dependent on parameters included in the multicast data packet, the multicast forward vector indicating to which egress ports the multicast data packet is to be forwarded.

10. A method for forwarding multicast data packets in a switch comprising the steps of:
    storing in a memory, a multicast data packet received from an ingress port;
    providing egress port forwarding logic, the egress port forwarding logic including a table of modification entries including a modification entry for each member of a multicast group associated with the multicast data packet an index to the table of modification entries for the multicast group stored with the data packet in the memory and editing logic for modifying the multicast data packet;

modifying in the egress port forwarding logic a copy of the multicast data packet received from the memory dependent on the modification entry;

forwarding by the egress port forwarding logic the modified copy of the multicast data packet to an egress port in a next available egress port cycle time;

selecting a multicast forward vector for the multicast data packet dependent on parameters included in the multicast data packet, the multicast forward vector indicating to which egress ports the multicast data packet is to be forwarded; and storing, by the packet manager a pointer to the multicast data packet stored in the memory in a port queue associated with the egress port dependent on the multicast forward vector.

11. The method for forwarding multicast packets in a switch as claimed in claim 10 further comprising the step of:

removing, by the packet manager the pointer to the multicast data packet stored in the port queue after all modified copies of the multicast data packet are transmitted to the egress port associated with the port queue.

12. A method for forwarding multicast data packets in a switch comprising the steps of:

storing in a memory, a multicast data packet received from an ingress port;

providing egress port forwarding logic, the egress port forwarding logic including a table of modification entries including a modification entry for each member of a multicast group associated with the multicast data packet an index to the table of modification entries for the multicast group stored with the data packet in the memory and editing logic for modifying the multicast data packet, the modification entry including a virtual LAN identification, a pointer to next entry, a tag indicator and a forward type indicator;

modifying in the egress port forwarding logic a copy of the multicast data packet received from the memory dependent on the modification entry; and forwarding by the egress port forwarding logic the modified copy of the multicast data packet to an egress port in a next available egress port cycle time.

13. The method for forwarding multicast packets in a switch as claimed in claim 12 wherein the pointer to next entry provides an index to a next modification entry storing the parameters for a second modified copy of the multicast data packet to be sent to the egress port.

14. A method for forwarding multicast data packets in a switch comprising the steps of:

storing in a memory, a multicast data packet received from an ingress port;

providing egress port forwarding logic, the egress port forwarding logic including a table of modification entries including a modification entry for each member of a multicast group associated with the multicast data packet, an index to the table of modification entries for the multicast group stored with the data packet in the memory editing logic for modifying the multicast data packet, the egress port forwarding logic including a virtual LAN identification table and an intermediate LAN identification table for storing the multicast entry, the multicast entry includes an index to a location in the virtual LAN identification table including a virtual LAN identification;

modifying in the egress port forwarding logic a copy of the multicast data packet received from the memory dependent on the modification entry; and forwarding by the egress port forwarding logic the modified copy of the multicast data packet to an egress port in a next available egress port cycle time.

15. A switch comprising:

a memory storing a multicast data packet received from an ingress port connected to the switch;

egress port forwarding logic, the egress port forwarding logic comprising:

a table of modification entries including a modification entry for each member of a multicast group associated with the multicast data packet, a plurality of members of the multicast group coupled to a same egress port, an index to the table of modification entries for the multicast group stored with the data packet in the memory; and means for modifying a copy of the multicast data packet received from the memory dependent on the modification entry associated with the member.

16. The switch as claimed in claim 15 further comprising:

means for generating a multicast forward vector for the multicast data packet, the multicast forward vector indicating to which ports the stored multicast data packet is to be forwarded.

17. The switch as claimed in claim 16 further comprising:

means for storing a pointer to the multicast data packet stored in the memory in at least one port queue dependent on the multicast forward vector.

18. A switch comprising:

a memory storing a multicast data packet received from an ingress port connected to the switch;

egress port forwarding logic, the egress port forwarding logic comprising:

a table of modification entries including a modification entry for each member of a multicast group associated with the multicast data packet an index to the table of modification entries for the multicast group stored with the data packet in the memory; and means for modifying a copy of the multicast data packet received from the memory dependent on the modification entry;

means for generating a multicast forward vector for the multicast data packet, the multicast forward vector indicating to which ports the stored multicast data packet is to be forwarded; and means for storing a pointer to the multicast data packet stored in the memory in at least one port queue dependent on the multicast forward vector, the means for storing removes the pointer to the multicast data packet stored in the port queue after the multicast data packet has been transmitted to each member of the multicast group connected to the egress port associated with the port queue.

19. A switch comprising:

a memory storing a multicast data packet received from an ingress port connected to the switch;

egress port forwarding logic, the egress port forwarding logic comprising:

a table of modification entries including a modification entry for each member of a multicast group associated with the multicast data packet, an index to the table of modification entries for the multicast group stored with the data packet in the memory, the modification entry comprises:

a virtual LAN identification;

a pointer to next entry;

a tag indicator; and a forward type indicator; and means for modifying a copy of the multicast data packet received from the memory dependent on the modification entry.

20. A switch as claimed in claim 19 wherein the pointer to next entry provides an index to a next modification entry storing the parameters for a next modified copy of the multicast data packet to be forwarded to the egress port.

21. A switch comprising:

a memory storing a multicast data packet received from an ingress port connected to the switch;

egress port forwarding logic, the egress port forwarding logic comprising:

a table of modification entries including a modification entry for each member of a multicast group associated with the multicast data packet, an index to the table of modification entries for the multicast group stored with the data packet in the memory, the modification entry comprises:

a virtual LAN entry stored in a virtual LAN identification table; and an intermediate entry stored in an intermediate entry stored in an intermediate LAN identification table wherein the intermediate entry includes an index to the virtual LAN entry; and means for modifying a copy of the multicast data packet received from the memory dependent on the modification entry.

* * * * *